US012651321B2

(12) United States Patent (10) Patent No.: US 12,651,321 B2
Kim et al. (45) Date of Patent: Jun. 9, 2026

(54) IMAGE PROCESSING METHOD AND APPARATUS WITH IMAGE DEBLURRING

(71) Applicant: SAMSUNG ELECTRONICS CO., LTD., Suwon-si (KR)

(72) Inventors: Insoo Kim, Suwon-si (KR); Geonseok Seo, Suwon-si (KR); Jae Seok Choi, Suwon-si (KR); Hyong Euk Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 301 days.

(21) Appl. No.: 18/359,067

(22) Filed: Jul. 26, 2023

(65) Prior Publication Data

US 2024/0153045 A1 May 9, 2024

(30) Foreign Application Priority Data

Nov. 7, 2022 (KR) ........................ 10-2022-0147226

(51) Int. Cl.
*G06T 5/73* (2024.01)
*G06T 5/20* (2006.01)
*G06T 5/50* (2006.01)

(52) U.S. Cl.
CPC .................. *G06T 5/73* (2024.01); *G06T 5/20* (2013.01); *G06T 5/50* (2013.01); *G06T 2207/20056* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 8,390,704 B2 | 3/2013 | Wang et al. | |
| 8,861,884 B1 * | 10/2014 | Fang | G06F 18/2413 |
| | | | 382/255 |
| 10,593,021 B1 * | 3/2020 | Shen | G06T 5/73 |
| 10,725,290 B2 * | 7/2020 | Fan | G02B 27/0012 |
| 11,669,939 B1 * | 6/2023 | Ferrés | G06T 5/60 |
| | | | 382/167 |
| 11,928,792 B2 * | 3/2024 | Wang | G06F 18/253 |
| 12,136,254 B2 * | 11/2024 | Kwon | G06N 3/08 |

(Continued)

FOREIGN PATENT DOCUMENTS

| | | | | | |
|---|---|---|---|---|---|
| CN | 112435205 A | * | 3/2021 | ............. | G06T 3/60 |
| CN | 113344799 A | * | 9/2021 | ............. | G06N 3/045 |

(Continued)

OTHER PUBLICATIONS

Gu, et al., "Kernel-Free Image Deblurring with a Pair of Blurred/ Noisy Images", arXiv preprint arXiv: 1903.10667v2 [cs.CV] Mar. 27, 2019, pp. 1-10.

(Continued)

*Primary Examiner* — Vu Le
(74) *Attorney, Agent, or Firm* — F. CHAU & ASSOCIATES, LLC

(57) ABSTRACT

An image processing method includes computing a blur kernel of an input image using a kernel estimation model, performing kernel-based deblurring on the input image using the blur kernel to obtain a deconvolved image, and generating an output image by performing kernel-free deblurring based on the deconvolved image.

19 Claims, 12 Drawing Sheets

(56) References Cited

U.S. PATENT DOCUMENTS

| | | | | |
|---|---|---|---|---|
| 2014/0307950 | A1 | 10/2014 | Jancsary et al. | |
| 2015/0131898 | A1 | 5/2015 | Schelten et al. | |
| 2019/0287215 | A1* | 9/2019 | Schroers | G06T 5/70 |
| 2020/0265567 | A1* | 8/2020 | Hu | G06T 5/50 |
| 2021/0183020 | A1* | 6/2021 | Gollanapalli | G06T 9/002 |
| 2021/0366095 | A1* | 11/2021 | Krishnamoorthy | G06F 17/18 |
| 2022/0284545 | A1* | 9/2022 | Ahn | G06N 3/08 |
| 2023/0043310 | A1* | 2/2023 | Yang | G06N 3/084 |
| 2023/0368341 | A1* | 11/2023 | Xu | G06T 5/77 |
| 2024/0303773 | A1* | 9/2024 | Sartor | G06T 5/60 |

FOREIGN PATENT DOCUMENTS

| | | | | |
|---|---|---|---|---|
| KR | 10-2020-0096026 | | 8/2020 | |
| KR | 102160101 | B1 * | 9/2020 | G06T 5/20 |
| KR | 10-2197089 | | 12/2020 | |
| KR | 10-2303002 | | 9/2021 | |
| WO | WO-2019214381 | A1 * | 11/2019 | G06N 3/045 |
| WO | 2022104180 | | 5/2022 | |

OTHER PUBLICATIONS

Zhang, et al., "Deep Image Deblurring: A Survey", arXiv preprint arXiv:2201.10700v2 [cs.CV] May 28, 2022, pp. 1-26.

Search Report dated Mar. 14, 2024 in corresponding EP Patent Application No. 23200487.9, 8 pages.

Nah, et al., "Clean Images Are Hard To Reblur: Exploiting The Ill-Posed Inverse Task For Dynamic Scene Deblurring", ICLR 2022, pp. 1-19.

Dong, et al., "Deep Wiener Deconvolution; Wiener Meets Deep Learning for Image Deblurring", NeurIIPS 2020, pp. 1-12.

Carbajal, et al., "Non-uniform Blur Kernal Estimation via Adaptive Basis Decomposition", arXiv preprint arXiv:2102.01026v2 [cs.CV] Apr. 26, 2021, pp. 1-19.

Tao, et al., "Scale-recurrent Network for Deep Image Deblurring", Computer Vision Foundation, pp. 8174-8182.

Cho, et al., "Rethinking Coarse-to-Fine Approach in Single Image Deblurring", Computer Vision Foundation, pp. 4641-4650.

* cited by examiner

FIG. 15

IMAGE PROCESSING METHOD AND APPARATUS WITH IMAGE DEBLURRING

CROSS-REFERENCE TO RELATED APPLICATION

This application claims priority under 35 U.S.C. 119 to Korean Patent Application No. 10-2022-0147226, filed on Nov. 7, 2022, in the Korean Intellectual Property Office, the disclosure of which is incorporated by reference herein in its entirety.

BACKGROUND

Embodiments of the present disclosure relate to image processing and more specifically image deblurring using machine learning.

Image processing refers to the use of a computer to modify, analyze, or generate images. Neural networks may be used for a number of image processing tasks. In some cases, neural networks are trained based on deep learning. A trained neural network may perform inference by mapping input data to output data, and the input data and the output data may have a nonlinear relationship. A neural network trained for a specific purpose, such as image restoration, can also have the ability to generalize and produce a relatively accurate output for an input that was not part of a training dataset.

SUMMARY

According to an aspect of the disclosure, an image processing method includes computing a blur kernel of an input image using a kernel estimation model, performing kernel-based deblurring on the input image using the blur kernel to obtain a deconvolved image, and generating an output image by performing kernel-free deblurring based on the deconvolved image.

According to an aspect of the disclosure, a non-transitory computer-readable storage medium storing instructions that, when executed by a processor, cause the processor to compute a blur kernel of an input image using a kernel estimation model, perform kernel-based deblurring on the input image using the blur kernel to obtain a deconvolved image, and generate an output image by performing kernel-free deblurring based on the deconvolved image.

According to an aspect of the disclosure, an image processing apparatus includes a processor, and a memory configured to store instructions executable by the processor, wherein in response to the instructions being executed by the processor, the processor computing a blur kernel of an input image using a kernel estimation model, performing kernel-based deblurring on the input image using the blur kernel to obtain a deconvolved image, and generate an output image by performing kernel-free deblurring based on the deconvolved image.

In another general aspect of the disclosure, a method which may be performed by a processor includes performing a frequency transform on an input image to obtain a frequency image, performing deconvolution deblurring on the frequency image to obtain a deconvolved image, and generating an output image based on the deconvolved image.

The method may further include performing kernel-based deblurring on the frequency image to obtain a blur kernel, and wherein the deconvolved image is obtained based on the frequency image and the blur kernel. The output image may be obtained by performing kernel free deblurring.

The method may further include performing an additional frequency transform on a temporary sharp image to obtain an additional frequency image, and the deconvolved image may be obtained based on the frequency image and the additional frequency image.

Additional aspects of example embodiments will be set forth in part in the description which follows and, in part, will be apparent from the description, or may be learned by practice of the disclosure.

BRIEF DESCRIPTION OF THE DRAWINGS

Figure 15:
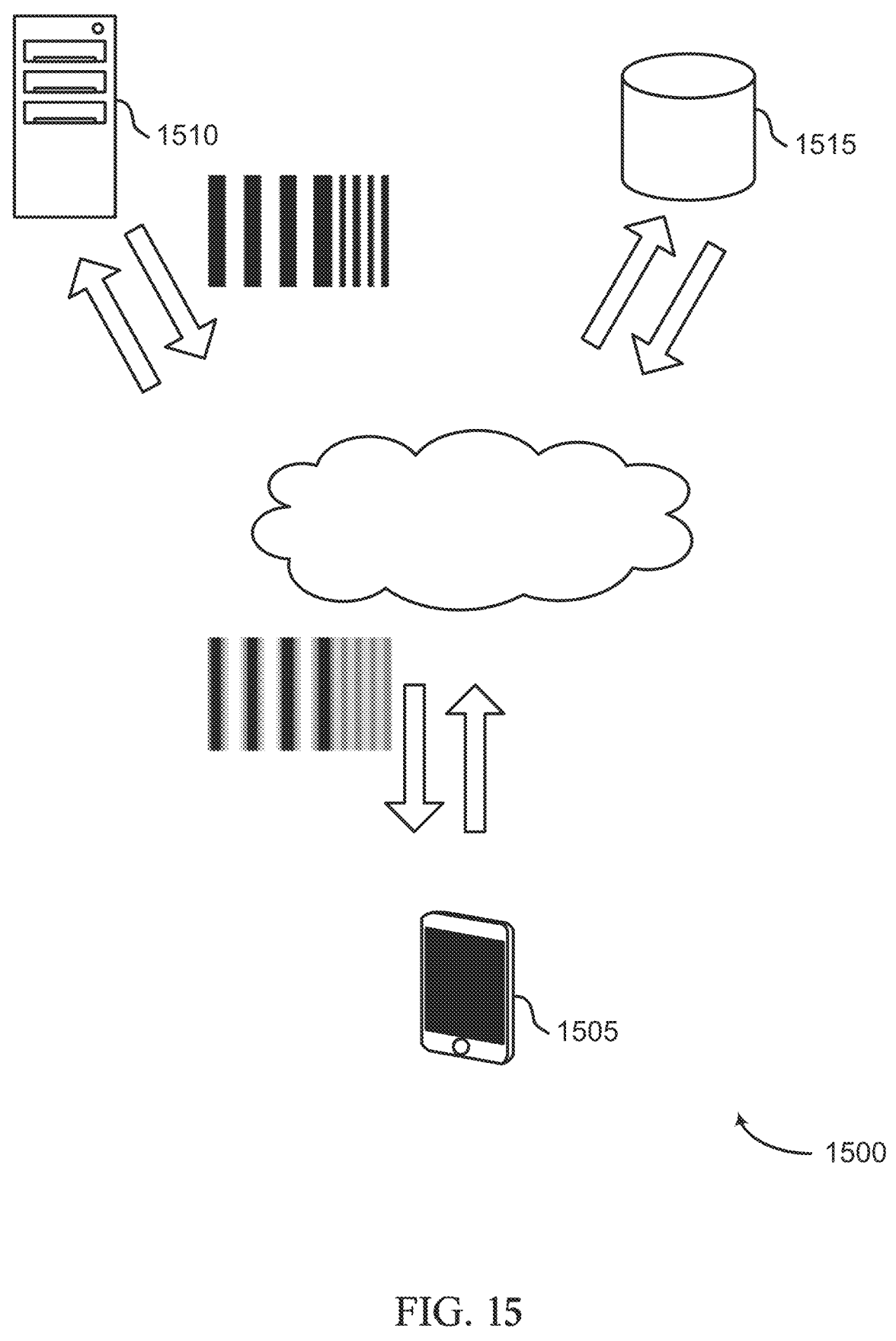

FIG. 15 illustrates an image processing system.

DETAILED DESCRIPTION

Figure 1:
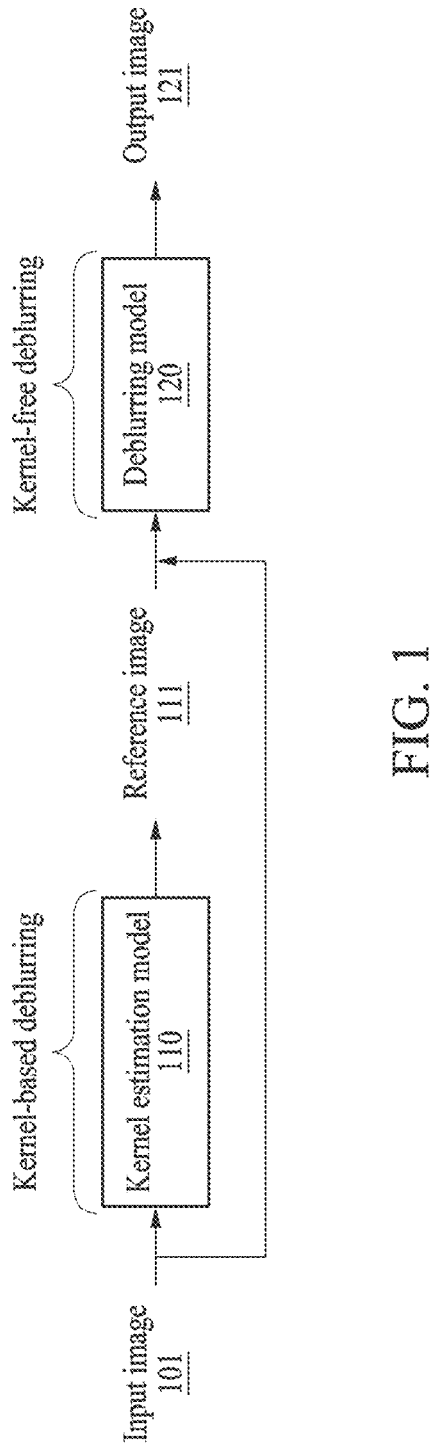
FIG. 1 is a diagram illustrating a deblurring operation using a kernel estimation model and a deblurring model according to an embodiment.

The present disclosure relates to image processing and more specifically image deblurring using machine learning.

Blurring in an image refers to when the sharpness and fine details in the image are lost or degraded. Blurring may be caused by various factors, such as motion during the picture-taking process, limited depth of field, or atmospheric turbulence. Blurring can be modeled as a linear convolution of the original image with a blur kernel. The blur kernel represents a point spread function applied to a hypothetical original image to obtain the blurred image.

In some examples, deconvolution deblurring (e.g., kernel-based deblurring) methods may be performed by computing the blur kernel. A deconvolution deblurring process represents a blur in the original image as a convolution operation with a known or computed function that describes the shape and strength of the blur. In some examples, the function is referred to as a kernel. The function can be a matrix or a continuous function. To enhance the features of the image that are relevant for the estimation, a kernel-based method may pre-process the data by using techniques such as edge detection and noise reduction to improve the accuracy of the deblurring.

In some examples, kernel-free deblurring methods may be performed using deep learning models that can learn the deblurring process from a large dataset of example images. For example, convolutional neural networks (CNNs) may be used to learn a mapping from a blurred image to a corresponding sharp image, without explicitly computing the blur kernel. In some cases, kernel-free deblurring methods may pre-process data to remove artifacts using techniques such as normalization.

The following detailed structural or functional description of embodiments is provided as an example only and various alterations and modifications may be made to the embodiments. Here, the embodiments are not construed as limited to the disclosure and should be understood to include all changes, equivalents, and replacements within the idea and the technical scope of the disclosure.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, embodiments will be described in detail with reference to the accompanying drawings. When describing the embodiments with reference to the accompanying drawings, like reference numerals refer to like elements and a repeated description related thereto will be omitted.

FIG. 1 is a diagram illustrating a deblurring operation using a kernel estimation model and a deblurring model according to an embodiment. Deblurring using a convolution kernel may be referred to as dconvolution deblurring.

Referring to FIG. 1, two-phase deblurring including kernel-based deblurring and kernel-free deblurring may be performed. Kernel-based deblurring may be referred to as primary deblurring, and kernel-free deblurring may be referred to as secondary deblurring. An input image 101 may be deblurred through the two-phase deblurring. An output of the deconvolution deblurring may be referred to as a deconvolution image and an output image 121 may be a result of the combined deblurring process. The output image 121 may be referred to as a sharp image. The two-phase deblurring may maximize the advantages of kernel-based deblurring and kernel-free deblurring and minimize the disadvantages thereof.

A kernel estimation model 110 may be used for kernel-based deblurring and a deblurring model 120 may be used for kernel-free deblurring. The kernel estimation model 110 and the deblurring model 120 may be neural network models. A neural network model may include a deep neural network (DNN) including a plurality of layers. The DNN may include at least one of a fully connected network (FCN), a convolutional neural network (CNN), or a recurrent neural network (RNN).

FCN is a fully connected neural network that includes a series of fully connected layers. A fully connected layer is a function in which each output dimension depends on each input dimension. A CNN is a class of neural network that is commonly used in computer vision or image classification systems. In some cases, a CNN may enable the processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input. For example, at least a portion of the layers included in the neural network may be a CNN, and another portion of the layers may be an FCN.

A CNN is a class of neural network that is commonly used in computer vision or image classification systems. In some cases, a CNN may enable the processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input. The CNN may be referred to as convolutional layers, and the FCN may be referred to as fully connected layers.

An RNN is a class of ANN in which connections between nodes form a directed graph along an ordered (i.e., a temporal) sequence. This enables an RNN to model temporally dynamic behavior such as predicting what element should come next in a sequence. Thus, an RNN is suitable for tasks that involve ordered sequences such as text recognition (where words are ordered in a sentence). The term RNN may include finite impulse recurrent networks (characterized by nodes forming a directed acyclic graph), and infinite impulse recurrent networks (characterized by nodes forming a directed cyclic graph).

The neural network may be trained based on deep learning. A trained neural network may perform inference by mapping input data to output data, where the input data and the output data have a nonlinear relationship. Deep learning is a subfield of machine learning that involves training artificial neural networks with large datasets to solve complex problems. It utilizes multiple layers of interconnected processing nodes to learn features from input data, enabling it to make accurate predictions or decisions. Deep learning models are capable of recognizing patterns in data and can be trained to perform tasks such as image and speech recognition, natural language processing, and autonomous decision making. Deep learning may be construed as an optimization problem solving process of finding a point at which energy is minimized while training a neural network using prepared training data.

Through supervised or unsupervised learning of deep learning, a structure of the neural network or a weight corresponding to a model may be obtained, and the input data and the output data may be mapped to each other through the weight. If the width and the depth of the neural network are sufficiently great, the neural network may have a capacity sufficient to implement a predetermined function. The neural network may achieve an optimized performance when learning a sufficiently large amount of training data through an appropriate training process.

In some cases, a neural network as described in the present disclosure may be expressed as being pre-trained. A pre-trained neural network is a class of neural network that has been trained on a large dataset before being applied to a specific task. By pre-training, the neural network can learn to recognize patterns and features that are commonly found in the dataset. A pre-trained neural network can then be applied to a specific task. In some examples, a pre-trained neural network is a neural network that is trained before inference. Inference in a neural network refers to the process of using a trained model to make predictions or decisions on new, unseen data. For example, the inference may also include that the neural network is loaded into a memory, and input data for inference is input into the neural network after the neural network is loaded into the memory.

The kernel estimation model 110 may be pre-trained to compute a blur kernel of the input image 101. The kernel estimation model 110 may compute the blur kernel of the input image 101, and a reference image 111 may be generated through deblurring of the input image 101 using the blur kernel. Input data may be determined by combining the input image 101 and the reference image 111. The output image 121 may be generated through a deblurring operation of the deblurring model 120 according to the input data. Input data of the kernel estimation model 110 may be referred to as first input data, and input data of the deblurring model 120 may be referred to as second input data.

Figure 2:
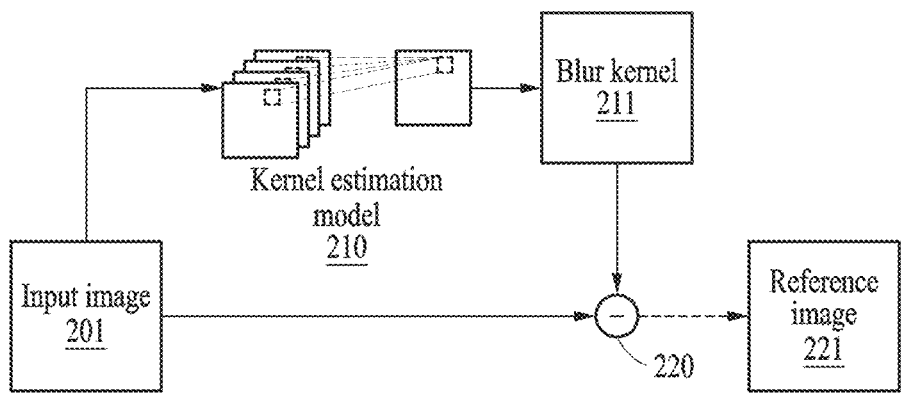
FIG. 2 is a diagram illustrating an example of a kernel estimation operation of computing a blur kernel of an input image in a spatial domain without a temporary sharp image according to an embodiment.

FIG. 2 is a diagram illustrating an example of a kernel estimation operation of computing a blur kernel of an input image in a spatial domain without a temporary sharp image according to an embodiment. Referring to FIG. 2, a kernel estimation model 210 may compute a blur kernel 211 for kernel-based deblurring in response to an input image 201 being input. The output of the kernel-based deburring may be referred to as a deconvolution image, which may be used as a reference image. Accordingly, a reference image 221 may be generated by removing the blur kernel 211 from the input image 201 according to a removal operation 220.

According to an embodiment, the reference image 221 of FIG. 2 may be derived in a spatial domain. In some cases, reference 221 is a deconvolved image. In this case, the removal operation 220 may be a deconvolution operation. A deconvolution operation may be a process that performs a reverse conclusion operation. Deconvolution blurring refers to a deblurring process that uses deconvolution (e.g., based on a convolution kernel) to reconstruct the sharp image from the blurred version of the sharp image. The deconvolution operation is the inverse of the convolution operation. The convolution operation is used to model the blurring process. The sharp image is convolved with a blur kernel, which is a mathematical representation of points in the sharp image being spread out or blurred in the blurred image. The output of the convolution operation may be the blurred image, and the output of a deconvolved operation may be the reconstructed sharp image (i.e., a deconvolution image).

Figure 3:
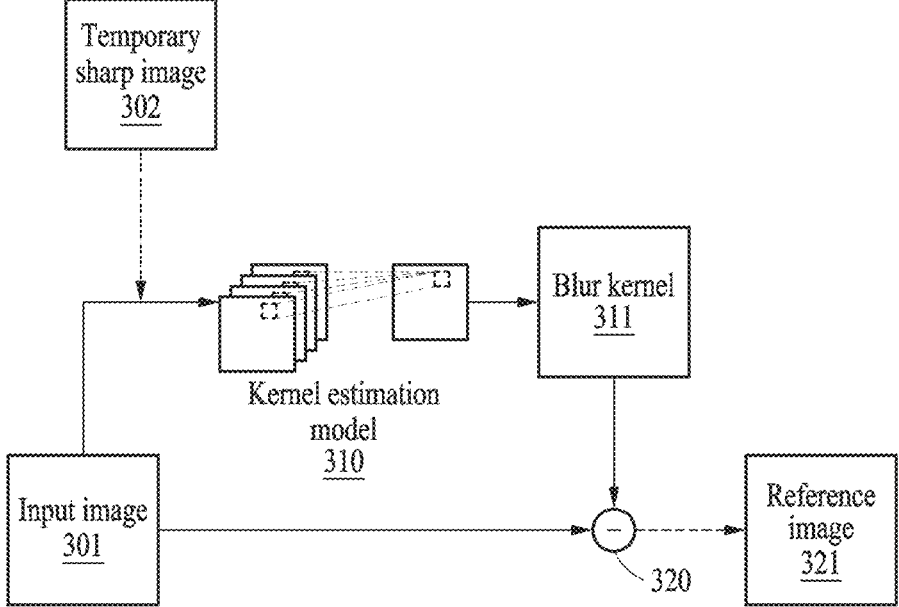
FIG. 3 is a diagram illustrating an example of a kernel estimation operation of computing a blur kernel of an input image in a spatial domain using a temporary sharp image according to an embodiment.

FIG. 3 is a diagram illustrating an example of a kernel estimation operation of computing a blur kernel of an input image in a spatial domain using a temporary sharp image according to an embodiment. Referring to FIG. 3, a kernel estimation model 310 may compute a blur kernel 311 for kernel-based deblurring in response to an input image 301 and a temporary sharp image 302 being input. The temporary sharp image 302 may be generated by performing a temporary deblurring on the input image 301. Temporary deblurring refers to a process of partially removing blurring from an image, where some blurs are corrected, and other blurs may remain. For example, a temporary deblurring may correct the ill-posed images. According to some embodiments, kernel-based deblurring may be performed on a combination of the temporary sharp image and the input image.

According to an embodiment, a sub-deblurring model that performs kernel-free deblurring may be used for the temporary deblurring task. The sub-deblurring model may be a neural network model and may include a relatively small number of layers. The deblurring task of the sub-deblurring model may require a relatively small amount of computation. The sub-deblurring model may be distinguished from a main deblurring model (e.g., the deblurring model 120 of FIG. 1) that performs a deblurring task using a reference image 321. The sub-deblurring model may include fewer layers than the main deblurring model, and the deblurring task of the sub-deblurring model may require a less amount of computation than the deblurring task of the main deblurring model.

The input image 301 and the temporary sharp image 302 may be input into the kernel estimation model 310 while being combined. First input data may be generated by combining the input image 301 and the temporary sharp image 302, and the blur kernel 311 may be computed by executing the kernel estimation model 310 with the first input data. For example, the input image 301 and the temporary sharp image 302 may be combined through concatenation. For example, the input image 301 and the temporary sharp image 302 may be concatenated channel-wise. The reference image 321 may be generated by removing the blur kernel 311 from the input image 301 according to a removal operation 320. According to an embodiment, the reference image 321 of FIG. 3 may be derived in a spatial domain. In some cases, reference image 310 is a reference image. In this case, the removal operation 320 may be a deconvolution operation.

Figure 4:
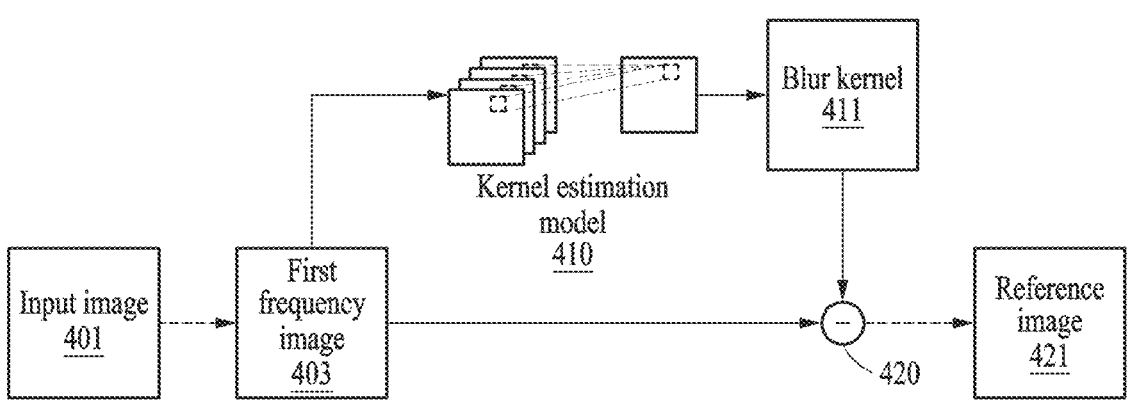
FIG. 4 is a diagram illustrating an example of a kernel estimation operation of computing a blur kernel of an input image in a frequency domain without a temporary sharp image according to an embodiment.

FIG. 4 is a diagram illustrating an example of a kernel estimation operation of computing a blur kernel of an input image in a frequency domain without a temporary sharp image according to an embodiment. Referring to FIG. 4, an input image 401 may be transformed into a first frequency image 403 in a frequency domain. The input image 401 may be transformed into the first frequency image 403 through a logarithmic Fourier transform. The logarithmic Fourier transform may include a Fourier transform. In some examples, a frequency transforms other than a Fourier transform may be used (e.g., a Hartley transform).

A kernel estimation model 410 may compute a blur kernel 411 for kernel-based deblurring in response to the first frequency image 403 being input. In this case, the blur kernel 411 may represent blur information of the input image 401 in terms of a frequency domain. A third frequency image may be generated by subtracting the blur kernel 411 from the first frequency image 403 according to a removal operation 420, and the third frequency image may be transformed into a reference image 421 in a spatial domain. According to an embodiment, the third frequency image may be transformed into the reference image 421 through an inverse logarithmic Fourier transform.

The reference image 421 of FIG. 4 may be derived in the frequency domain. A deconvolution operation in the spatial domain may be a subtraction operation in the frequency domain according to a logarithmic Fourier transform. The removal operation 420 of FIG. 4 may be a subtraction operation. When the deconvolution operation is replaced with a subtraction operation in the frequency domain, a mapping relationship between sharp information and blur information inferred by the kernel estimation model 410 may be simplified. Accordingly, the size of the kernel estimation model 410 required to achieve a desired performance may be reduced, or better performance may be achieved with the kernel estimation model 410 of the same size.

Figure 5:
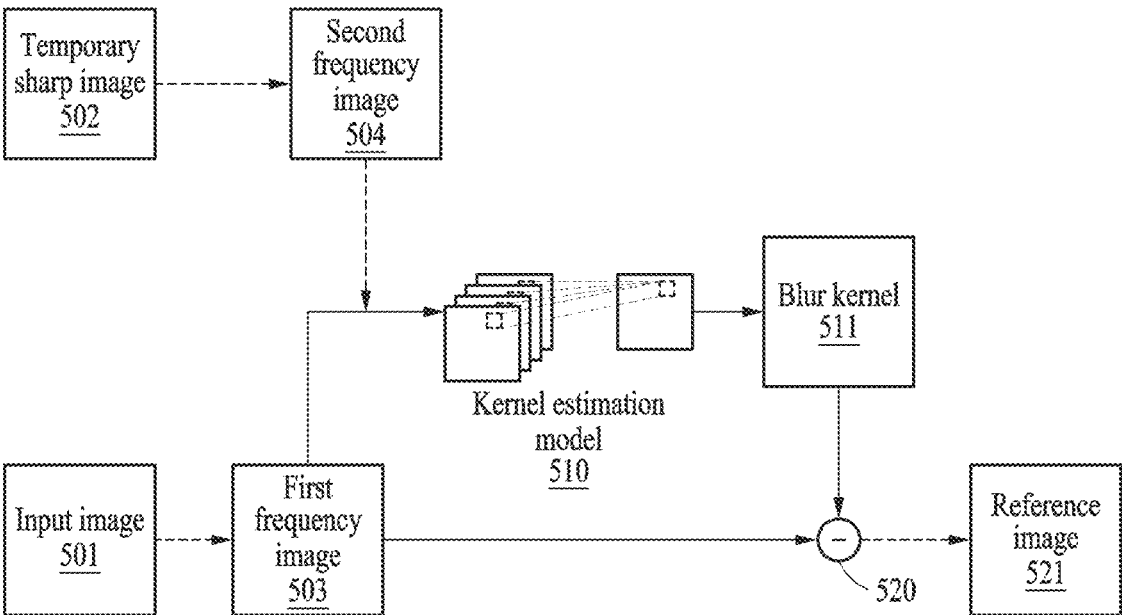
FIG. 5 is a diagram illustrating an example of a kernel estimation operation of computing a blur kernel of an input image in a frequency domain using a temporary sharp image according to an embodiment.

FIG. 5 is a diagram illustrating an example of a kernel estimation operation of computing a blur kernel of an input image in a frequency domain using a temporary sharp image according to an embodiment. Referring to FIG. 5, an input image 501 may be transformed into a first frequency image 503 in a frequency domain, and a temporary sharp image 502 may be transformed into a second frequency image 504 in the frequency domain. The input image 501 and the temporary sharp image 502 may be transformed into the first frequency image 503 and the second frequency image 504, respectively, through a logarithmic Fourier transform. For example, the logarithmic Fourier transform may include a Fourier transform. The temporary sharp image 502 may be generated through a temporary deblurring task on the input image 501.

The first frequency image 503 and the second frequency image 504 may be input into a kernel estimation model 510 while being combined. First input data may be generated by combining the first frequency image 503 and the second frequency image 503, and a blur kernel 511 for kernel-based deblurring may be computed by executing the kernel estimation model 510 with the first input data. For example, the first frequency image 503 and the second frequency image 503 may be combined through concatenation. For example, the first frequency image 503 and the second frequency image 503 may be concatenated channel-wise. The blur kernel 511 may represent blur information of the input image 501 in terms of a frequency domain.

A third frequency image may be generated by subtracting the blur kernel 511 from the first frequency image 503 according to a removal operation 520, and the third frequency image may be transformed into a reference image 521 in a spatial domain. According to an embodiment, the third frequency image may be transformed into the reference image 521 through an inverse logarithmic Fourier transform. The reference image 521 of FIG. 5 may be derived in the frequency domain according to a logarithmic Fourier transform. In this case, the removal operation 520 may be a subtraction operation.

Figure 6:
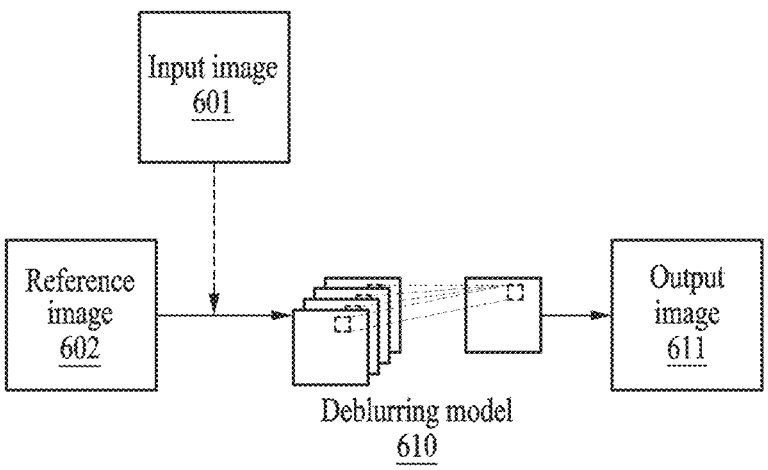
FIG. 6 is a diagram illustrating a deblurring operation of generating an output image using an input image and a reference image according to an embodiment.

FIG. 6 is a diagram illustrating a deblurring operation of generating an output image using an input image and a reference image according to an embodiment. Referring to FIG. 6, second input data of a deblurring model 610 may be determined by combining an input image 601 and a reference image 602. For example, the input image 601 and the reference image 602 may be combined through concatenation. For example, the input image 601 and the reference image 602 may be concatenated channel-wise. The deblurring model 610 may perform kernel-free deblurring on the second input data, and an output image 611 may be generated according to a result of the kernel-free deblurring.

Figure 7:
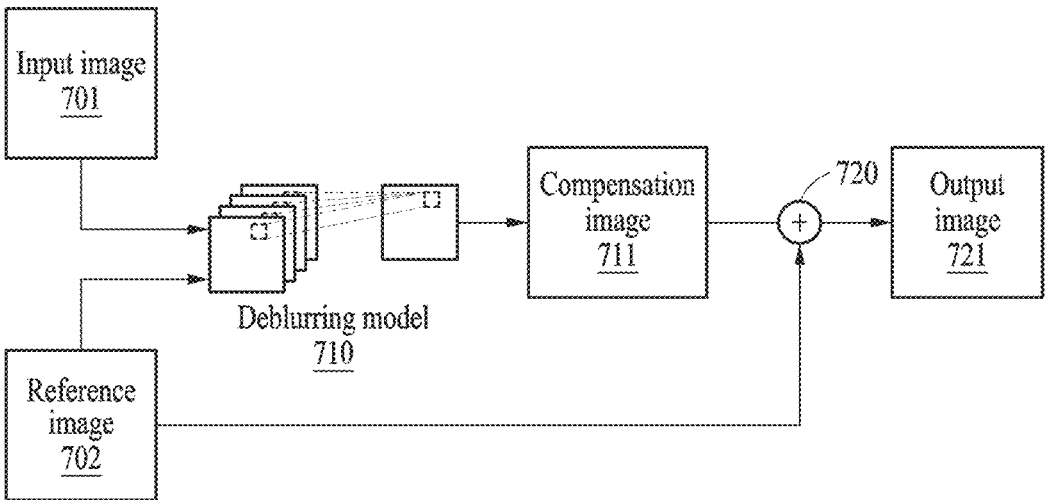
FIG. 7 is a diagram illustrating a deblurring operation based on compensation image estimation according to an embodiment.

FIG. 7 is a diagram illustrating a deblurring operation based on compensation image estimation according to an embodiment. Referring to FIG. 7, second input data of a deblurring model 710 may be determined by combining an input image 701 and a reference image 702. For example, the input image 701 and the reference image 702 may be combined through concatenation. For example, the input image 701 and the reference image 702 may be concatenated channel-wise. The deblurring model 710 may compute a compensation image 711 in response to the second input data being input. An output image 721 may be generated by adding the compensation image 711 to the reference image 702 according to a summation operation 720.

According to some embodiments, the compensation image 711 is an image that represents the difference between the observed blurred image and the estimated sharp image. For example, the compensation image 711 may be used to correct for the loss of information caused by the blur and recover the underlying sharp image. In some cases, the compensation image 711 compensates for at least one of a first error coming from computing the blur kernel and a second error coming from using a non-uniform blur in the input image as a uniform blur. The compensation image 711 may compensate for at least one of a first error occurring in the process of computing a blur kernel for kernel-based deblurring or a second error occurring as a non-uniform blur in the input image 701 is regarded as a uniform blur. The action of the compensation image 711 may be expressed by Equation 1 below.

$$
\begin{aligned}
x = (y \odot k) + e_k &= \left( y \odot \left( \tilde{k} + \Delta k \right) \right) + e_k \qquad \text{[Equation 1]} \\
&= y \odot \tilde{k} + y \odot \Delta k + e_k \\
&= y \odot \tilde{k} + e_m + e_k \\
&= y \odot \tilde{k} + e
\end{aligned}
$$

In Equation 1, x denotes a sharp image, y denotes a blurred image, k denotes a blur kernel of the blurred image y, and $\odot$ denotes a deconvolution operation. An actual blur in the blurred image y may be a non-uniform blur, but for convenience, it may be assumed that the blur in the blurred image y corresponds to a uniform blur. $e_k$ denotes an error occurring as a non-uniform blur is regarded as a uniform blur. The blur kernel k may be a ground truth (GT) uniform blur kernel, and $\tilde{k}$ may be a computed blur kernel. $\Delta k$ denotes a difference between k and $\tilde{k}$. $e_m$ denotes an error occurring in the process of computing the blur kernel k. e denotes the sum of the error $e_m$ and the error $e_k$. $e_m$ may be referred as a first error, and $e_k$ may be referred to as a second error.

Referring to Equation 1 and FIG. 7, the input image 701 may be the blurred image y. According to embodiments, the blur kernel of the input image 701 may be computed using a kernel estimation model, and the reference image 702 may be generated through deblurring of the input image 701 using the computed blur kernel. The reference image 702 may be a result of deconvolution between the blurred image y and the computed blur kernel k. The deblurring model 710 may be pre-trained to infer the error e. In this case, the compensation image 711 may be the error e. The output image 721 according to the sum of the reference image 702 and the compensation image 711 may be the sharp image x.

Figure 8:
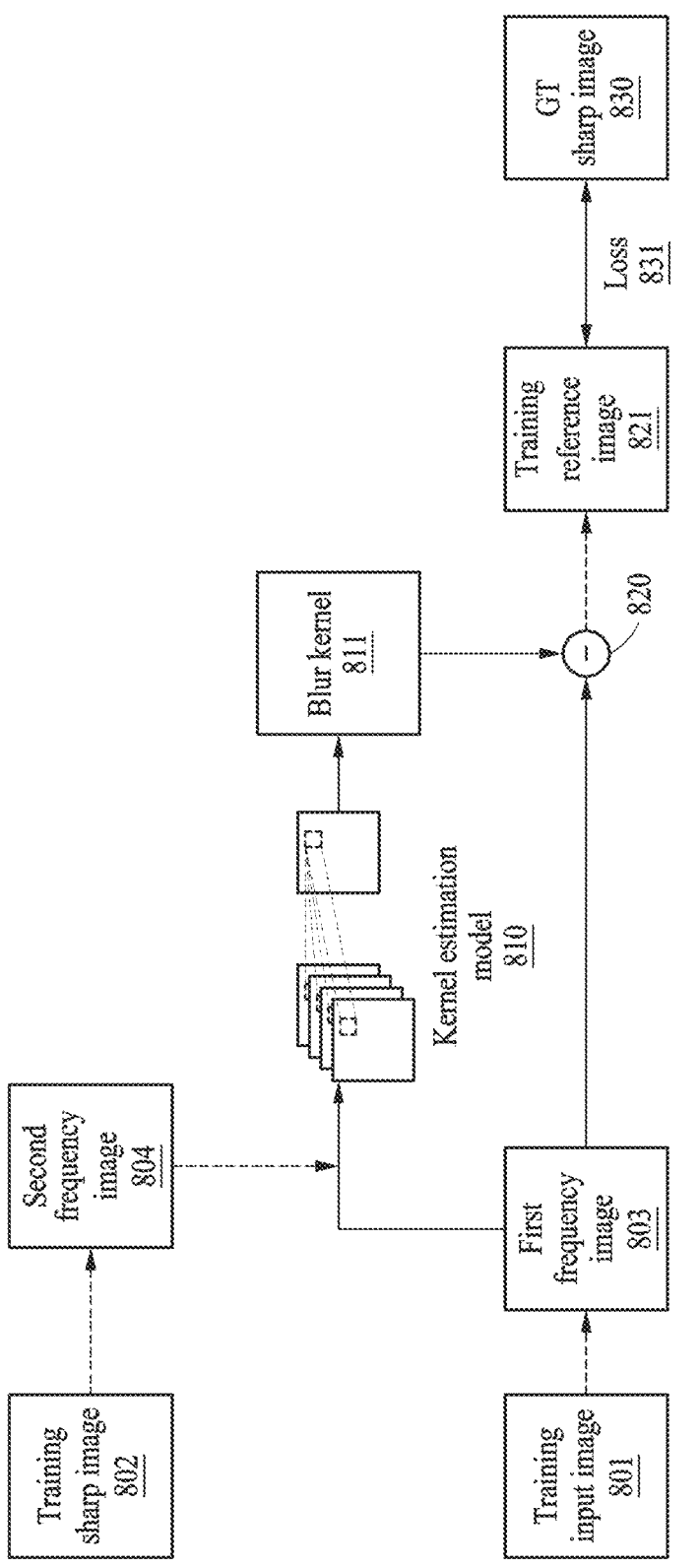
FIG. 8 is a diagram illustrating training of a kernel estimation model using a loss of a training reference image according to an embodiment.

FIG. 8 is a diagram illustrating training of a kernel estimation model using a loss of a training reference image according to an embodiment. Referring to FIG. 8, according to a logarithmic Fourier transform, a training input image 801 may be transformed into a first frequency image 803 in a frequency domain, and a training sharp image 802 may be transformed into a second frequency image 804 in the frequency domain. The training sharp image 802 may be a sharp image corresponding to a sharp version of the training input image 801, or may be a temporary sharp version generated through a temporary deblurring task on the training input image 801. In the former case, a predetermined blur may be applied to a sharp version of the training sharp image 802, such that a blurred version of the training input image 801 may be generated. In this case, the training sharp image 802 and a GT sharp image 830 may be the same.

The first frequency image 803 and the second frequency image 804 may be input into a kernel estimation model 810 while being combined. First input data may be generated by combining the first frequency image 803 and the second frequency image 804, and a blur kernel 811 for kernel-based deblurring may be computed by executing the kernel estimation model 810 with the first input data. A third frequency image may be generated by subtracting the blur kernel 811 from the first frequency image 803 according to a removal operation 820, and the third frequency image may be transformed into a training reference image 821 in a spatial domain. A loss 831 between the GT sharp image 830 and the training reference image 821 may be determined, and the kernel estimation model 810 may be trained to reduce the loss 831.

Although FIG. 8 illustrates a process of training the kernel estimation model 810 in the frequency domain, the kernel estimation model 810 may also be trained in the spatial domain without the process of transformation to the frequency domain. The kernel estimation model 210 of FIG. 2 and the kernel estimation model 310 of FIG. 3 may be trained in the spatial domain. The kernel estimation model 410 of FIG. 4 and the kernel estimation model 510 of FIG. 5 may be trained in the frequency domain.

Figure 9:
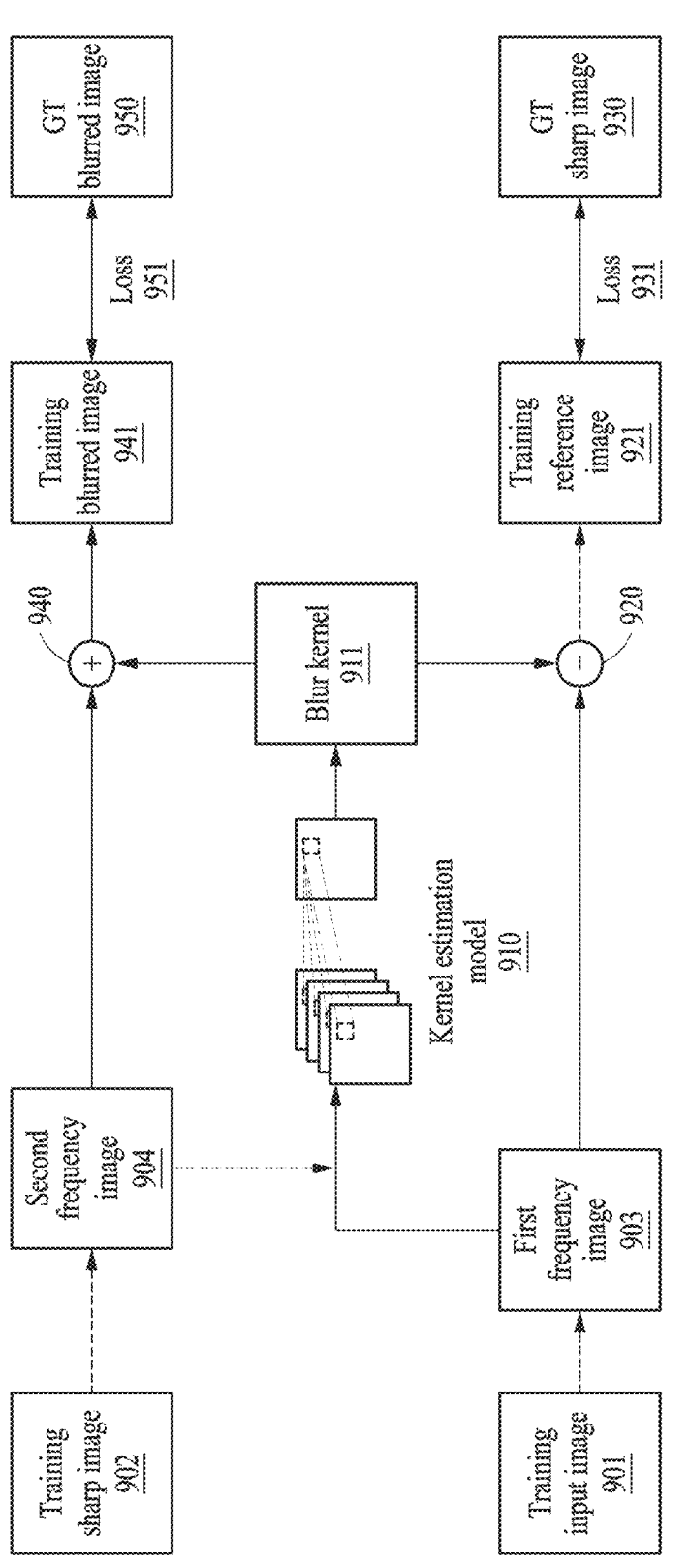
FIG. 9 is a diagram illustrating training of a kernel estimation model using a loss of a training reference image and a loss of a training blurred image according to an embodiment.

FIG. 9 is a diagram illustrating training of a kernel estimation model using a loss of a training reference image and a loss of a training blurred image according to an embodiment. In the example of FIG. 9, unlike the example of FIG. 8, losses 931 and 951 of two aspects may be used. Referring to FIG. 9, according to a logarithmic Fourier transform, a training input image 901 may be transformed into a first frequency image 903 in a frequency domain, and a training sharp image 902 may be transformed into a second frequency image 904 in the frequency domain. The training sharp image 902 may be a sharp image corresponding to a sharp version of the training input image 901, or may be a temporary sharp version generated through a temporary deblurring task on the training input image 901.

The first frequency image 903 and the second frequency image 904 may be input into a kernel estimation model 910 while being combined. First input data may be generated by combining the first frequency image 903 and the second frequency image 904, and a blur kernel 911 for kernel-based deblurring may be computed by executing the kernel estimation model 910 with the first input data.

A third frequency image may be generated by subtracting the blur kernel 911 from the first frequency image 903 according to a removal operation 920, and the third frequency image may be transformed into a training reference image 921 in a spatial domain. A fourth frequency image may be generated by adding the blur kernel 911 to the second frequency image 904 according to a summation operation 940, and the fourth frequency image may be transformed into a training blurred image 941 in the spatial domain. The loss 931 between a GT sharp image 930 and the training reference image 921 and the loss 951 between a GT blurred image 950 and the training blurred image 941 may be determined. The GT sharp image 930 may be the training sharp image 902, and the GT blurred image 950 may be the training input image 901.

The kernel estimation model 910 may be trained to reduce the loss 931 and the loss 951. According to an embodiment, the kernel estimation model 910 may be trained to reduce the sum of the loss 931 and the loss 951. As in FIG. 9, using the losses 931 and 951 of two aspects may reduce ill-posedness and improve the accuracy of computing the kernel estimation model 910. According to an embodiment, the kernel estimation model 910 may be trained based on Equation 2 below.

$$L_{kernel}(\psi; \mathcal{D}) = \frac{1}{|\mathcal{D}|} \sum_{(x,y)\in\mathcal{D}} d(\tilde{x}, x) + \lambda d(\tilde{y}, y) \qquad \text{[Equation 2]}$$

In Equation 2, $L_{kernel}$ denotes a loss value for training the kernel estimation model 910, $\psi$ denotes a parameter set of the kernel estimation model 910, D denotes a training data set, x denotes a sharp image, y denotes a blurred image, $\tilde{x}$ denotes a computed sharp image, $\tilde{y}$ denotes a computed blurred image, d denotes a difference between input values, and $\lambda$ denotes a weighting coefficient. In FIG. 9, the training input image 901 and the GT blurred image 950 may be the blurred image y, the training harp image 902 and the GT sharp image 930 may be the sharp image x, the training blurred image 941 may be the computed blurred image $\tilde{y}$, and the training reference image 921 may be the computed sharp image $\tilde{x}$. The computed sharp image $\tilde{x}$ and the computed blurred image $\tilde{y}$ may be expressed by Equation 3 and Equation 4 below, respectively.

$$\tilde{x} = F_L^{-1}\big(Y^L - f_\psi(X^L, Y^L)\big) \qquad \text{[Equation 3]}$$

$$\tilde{y} = F_L^{-1}\big(X^L + f_\psi(X^L, Y^L)\big) \qquad \text{[Equation 4]}$$

In Equations 3 and 4, $X^L$ denotes a frequency image of the sharp image x, $Y^L$ denotes a frequency image of the blurred image y, $f_\psi$ denotes the kernel estimation model 910, and $F_L^{-1}$ denotes a transform (e.g., an inverse logarithmic Fourier transform) from the frequency domain to the spatial domain. $X^L$ and $Y^L$ may be generated according to a logarithmic Fourier transform. In FIG. 9, the first frequency image 903 may be $Y^L$, and the second frequency image 904 may be $X^L$.

Although FIG. 9 illustrates a process of training the kernel estimation model 910 in the frequency domain. The kernel estimation model 910 may also be trained in the spatial domain without the process of transformation to the frequency domain. The kernel estimation model 210 of FIG. 2 and the kernel estimation model 310 of FIG. 3 may be trained in the spatial domain. The kernel estimation model 410 of FIG. 4 and the kernel estimation model 510 of FIG. 5 may be trained in the frequency domain.

Figure 10:
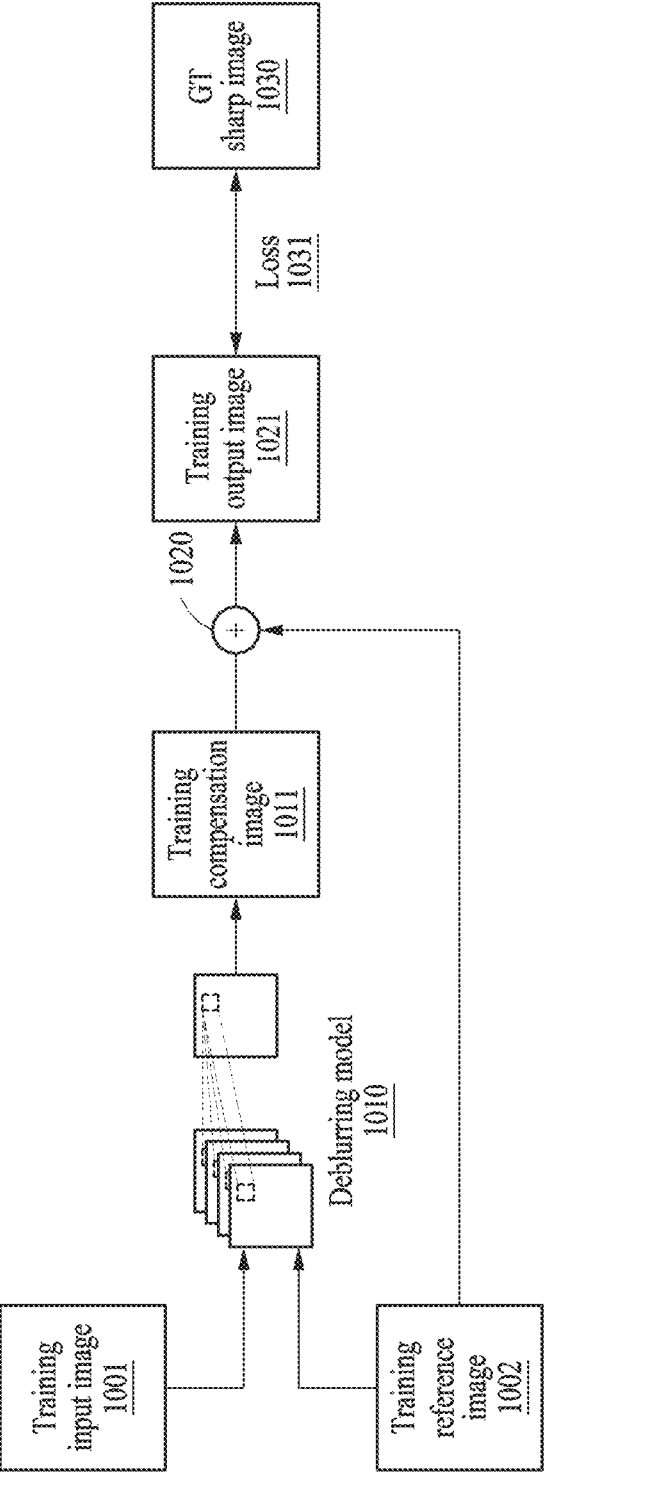
FIG. 10 is a diagram illustrating training of a deblurring model according to an embodiment.

FIG. 10 is a diagram illustrating training of a deblurring model according to an embodiment. Referring to FIG. 10, second input data of a deblurring model 1010 may be determined by combining a training input image 1001 and a training reference image 1002. The deblurring model 1010 may compute a training compensation image 1011 in response to the second input data being input. A training output image 1021 may be generated by adding the training compensation image 1011 to the training reference image 1002 according to a summation operation 1020.

A loss 1031 between a GT sharp image 1030 and the training output image 1021 may be determined, and the deblurring model 1010 may be trained to reduce the loss 1031. The deblurring model 1010 may be trained, through the training process using the loss 1031, to output the compensation image 1011 that compensates for at least one of a first error occurring in the process of computing a blur kernel for kernel-based deblurring or a second error occurring as a non-uniform blur in the input image 1001 is regarded as a uniform blur.

According to an embodiment, the deblurring model 1010 may be trained according to Equation 5 below.

$$L_{deblur}(\theta; \mathcal{D}) = \frac{1}{|\mathcal{D}|} \sum_{(x,y) \in \mathcal{D}} d(\tilde{x} + f_\theta(\tilde{x}, y), x) \qquad \text{[Equation 5]}$$

In Equation 5, $L_{deblur}$ denotes a loss value for training the deblurring model 1010, $\theta$ denotes a parameter set of the deblurring model 1010, D denotes a training data set, x denotes a sharp image, y denotes a blurred image, $\tilde{x}$ denotes a computed sharp image, d denotes a difference between input values, and $f_\theta$ denotes the deblurring model 1010. In FIG. 10, the training input image 1001 may be the blurred image y, the GT sharp image 1030 may be the sharp image x, and the training reference image 1002 may be the computed sharp image $\tilde{x}$ The training compensation image 1011 corresponding to an output of the deblurring model 1010 may be expressed by Equation 6 below.

$$e = f\theta(\tilde{x}, y) = f_\theta(F_L^{-1}(Y^L - f_\psi(X^L, Y^L)), y) \qquad \text{[Equation 6]}$$

In Equation 6, e denotes an error. The error e may include at least one of the first error occurring in the process of computing a blur kernel for kernel-based deblurring or the second error occurring as the non-uniform blur in the input image 1001 is regarded as a uniform blur. The computed sharp image $\tilde{x}$ may be determined according to Equation 3 above.

Figure 11:
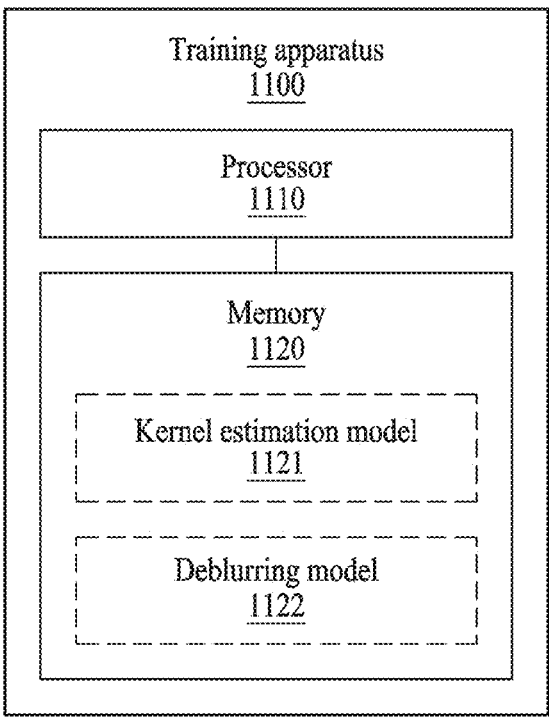
FIG. 11 is a block diagram illustrating an exemplary configuration of a training apparatus according to an embodiment.

FIG. 11 is a block diagram illustrating an exemplary configuration of a training apparatus according to an embodiment. Referring to FIG. 11, a training apparatus 1100 may include a processor 1110 and a memory 1120. The memory 1120 is connected to the processor 1110, and stores instructions executable by the processor 1110, data to be calculated by the processor 1110, or data processed by the processor 1110. The memory 1120 includes a non-transitory computer readable medium, for example, a high-speed random access memory, and/or a non-volatile computer readable storage medium, for example, at least one disk storage device, flash memory device, or other non-volatile solid state memory devices.

Figure 12:
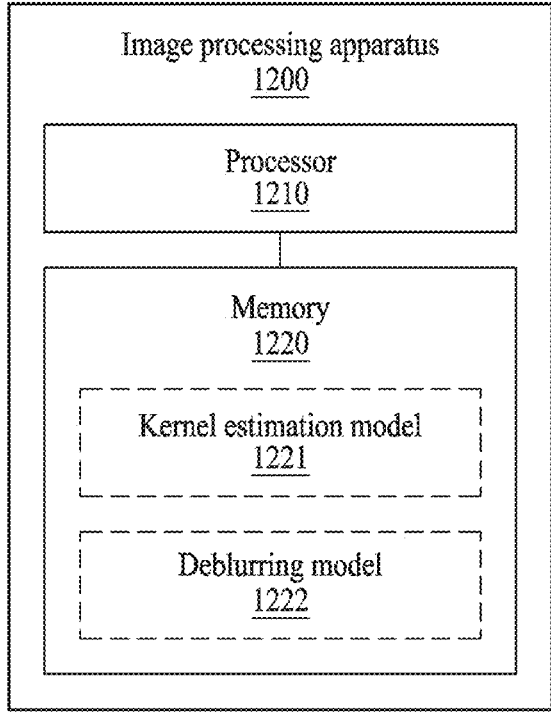
FIG. 12 is a block diagram illustrating an exemplary configuration of an image processing apparatus according to an embodiment.
Figure 13:
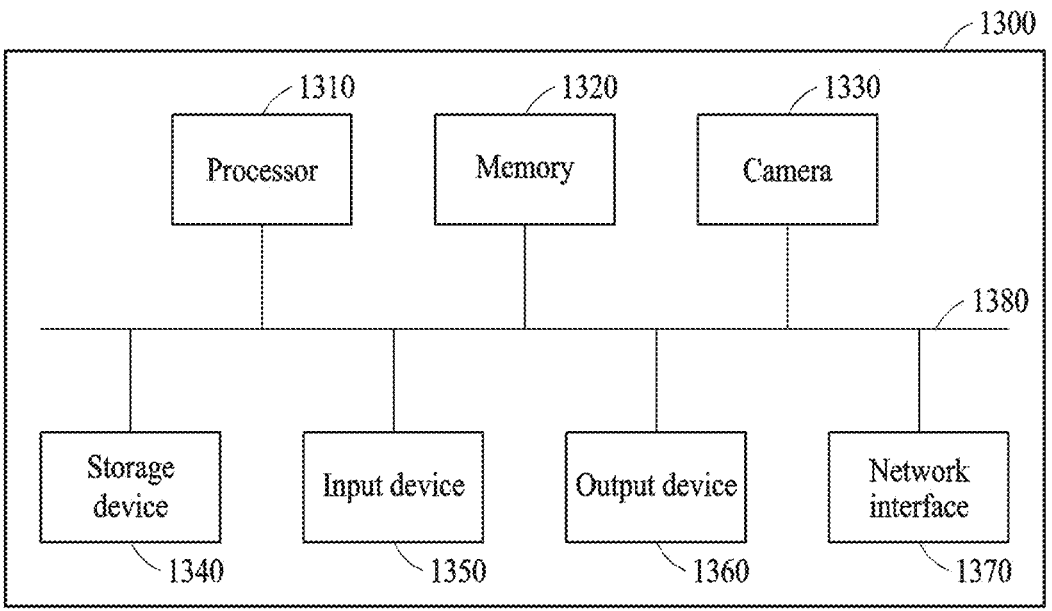
FIG. 13 is a block diagram illustrating an exemplary configuration of an electronic device according to an embodiment.
Figure 14:
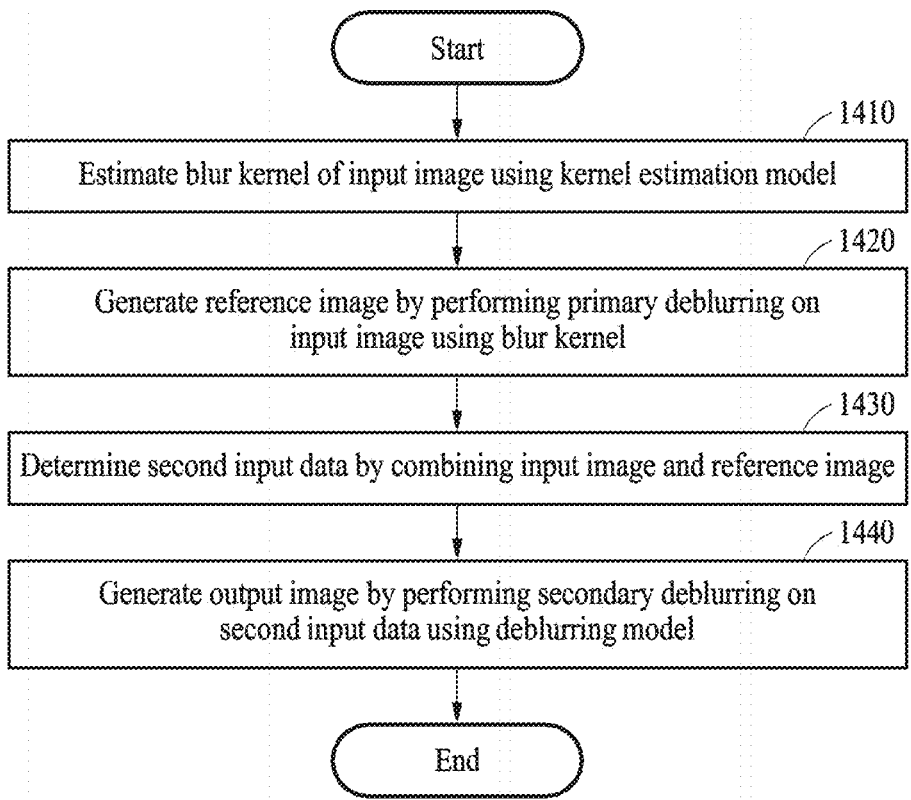
FIG. 14 is a flowchart illustrating an image processing method using a kernel estimation model and a deblurring model according to an embodiment.

The processor 1110 may execute instructions to perform the operations of FIGS. 1 to 10 and operations of FIGS. 12 to 14. For example, the memory 1120 may store a kernel estimation model 1121 and a deblurring model 1122, and the processor 1110 may train the kernel estimation model 1121 and the deblurring model 1122 using a training data set. For example, the training data set may include a large number of training data pairs, and each training data pair may include at least a portion of a training input image, a training sharp image, a GT sharp image, and a GT blurred image. In addition, the description of FIGS. 1 to 10 and the description of FIGS. 12 to 14 may apply to the training apparatus 1100.

FIG. 12 is a block diagram illustrating an exemplary configuration of an image processing apparatus according to an embodiment. Referring to FIG. 12, an image processing apparatus 1200 may include a processor 1210 and a memory 1220. The memory 1220 is connected to the processor 1210 and may store instructions executable by the processor 1210, data to be operated by the processor 1210, or data processed by the processor 1210. The memory 1220 may include non-transitory computer-readable media, for example, high-speed random access memory and/or non-volatile computer-readable storage media, such as, for example, at least one disk storage device, flash memory device, or other non-volatile solid state memory device.

The processor 1210 may execute the instructions to perform the operations of FIGS. 1 to 11 and 13. For example, the memory 1220 may store a kernel estimation model 1221 and a deblurring model 1222, and the processor 1210 may perform a deblurring task on an input image using the kernel estimation model 1221 and the deblurring model 1222. The processor 1210 may compute a blur kernel of an input image using a kernel estimation model, generate a reference image by performing primary deblurring on the input image using the blur kernel, determine second input data by combining the input image and the reference image, and generate an output image by performing secondary deblurring on the second input data using a deblurring model. The primary deblurring may be kernel-based deblurring and the secondary deblurring may be kernel-free deblurring. In this case, the kernel estimation model 1221 and the deblurring model 1222 may be pre-trained. In addition, the description provided with reference to FIGS. 1 to 11, and 13 may apply to the image processing apparatus 1200.

FIG. 13 is a block diagram illustrating an exemplary configuration of an electronic device according to an embodiment. Referring to FIG. 13, an electronic device 1300 may include a processor 1310, a memory 1320, a camera 1330, a storage device 1340, an input device 1350, an output device 1360, and a network interface 1370 that may communicate with each other through a communication bus 1380. For example, the electronic device 1300 may be implemented as at least a part of a mobile device such as a mobile phone, a smart phone, a PDA, a netbook, a tablet computer or a laptop computer, a wearable device such as a smart watch, a smart band or smart glasses, a computing device such as a desktop or a server, a home appliance such as a television, a smart television or a refrigerator, a security device such as a door lock, or a vehicle such as an autonomous vehicle or a smart vehicle. The electronic device 1300 may structurally and/or functionally include the training apparatus 1100 of FIG. 11 and/or the image processing apparatus 1200 of FIG. 12.

The processor 1310 executes functions and instructions for execution in the electronic device 1300. For example, the processor 1310 may process instructions stored in the memory 1320 or the storage device 1340. The processor 1310 may perform operations of FIGS. 1 to 12 and FIG. 14. The memory 1320 may include a computer-readable storage medium or a computer-readable storage device. The memory 1320 may store instructions to be executed by the processor 1310 and may store related information while software and/or an application is executed by the electronic device 1300.

The camera 1330 may capture a photo and/or a video. The photo and/or the video may be an input image, and a deblurring task may be performed on the input image. The storage device 1340 includes a computer-readable storage medium or computer-readable storage device. The storage device 1340 may store a more quantity of information than the memory 1320 for a long time. For example, the storage device 1340 may include a magnetic hard disk, an optical disc, a flash memory, a floppy disk, or other types of non-volatile memory known in the art.

The input device 1350 may receive an input from the user in traditional input manners through a keyboard and a mouse, and in new input manners such as a touch input, a voice input, and an image input. For example, the input device 1350 may include a keyboard, a mouse, a touch screen, a microphone, or any other device that detects the input from the user and transmits the detected input to the electronic device 1300. The output device 1360 may provide an output of the electronic device 1300 to the user through a visual, auditory, or haptic channel. The output device 1360 may include, for example, a display, a touch screen, a speaker, a vibration generator, or any other device that provides the output to the user. The network interface 1370 may communicate with an external device through a wired or wireless network.

FIG. 14 is a flowchart illustrating an image processing method using a kernel estimation model and a deblurring model according to an embodiment. Referring to FIG. 14, an image processing apparatus may compute a blur kernel of an input image using a kernel estimation model in operation 1410, generate a reference image by performing primary deblurring on the input image using the blur kernel in operation 1420, determine second input data by combining the input image and the reference image in operation 1430, and generate an output image by performing secondary deblurring on the second input data using a deblurring model in operation 1440. The primary deblurring may be kernel-based deblurring and the secondary deblurring may be kernel-free deblurring.

Operation 1410 may include an operation of generating a temporary sharp image by performing a temporary deblurring task on the input image, an operation of generating first input data based on the input image and the temporary sharp image, and an operation of computing the blur kernel by executing the kernel estimation model with the first input data. The operation of generating the first input data may include an operation of transforming the input image into a first frequency image in a frequency domain through a logarithmic Fourier transform, an operation of transforming the temporary sharp image into a second frequency image in the frequency domain, and an operation of generating the first input data by combining the first frequency image and the second frequency image. The blur kernel may represent a blur characteristic of the input image in the frequency domain, and operation 1420 may include an operation of generating a third frequency image by subtracting the blur kernel from the first frequency image, and an operation of transforming the third frequency image into the reference image in a spatial domain.

Operation 1410 may include an operation of transforming the input image into a first frequency image in a frequency domain through a logarithmic Fourier transform, and an operation of computing the blur kernel by executing the kernel estimation model with the first frequency image. The blur kernel may represent a blur characteristic of the input image in the frequency domain, and operation 1420 may include an operation of generating a third frequency image by subtracting the blur kernel from the first frequency image, and an operation of transforming the third frequency image into the reference image in a spatial domain.

Operation 1440 may include an operation of computing a compensation image by executing the deblurring model with the second input data, and an operation of generating the output image by adding the compensation image to the reference image. The compensation image may compensate for at least one of a first error occurring in the computing of the blur kernel or a second error occurring as a non-uniform blur in the input image is regarded as a uniform blur.

The primary deblurring may be kernel-based deblurring, and the secondary deblurring may be kernel-free deblurring. The kernel estimation model and the deblurring model may be neural network models. In addition, the description of FIGS. 1 to 13 may apply to the image processing method of FIG. 14.

FIG. 15 illustrates an image processing system 1500. The image processing system 1500 may include a capturing device 1505, an image processing apparatus 1510, and a database 1515. The image processing system 1500 may be capable of training and applying one or more neural networks capable performing multiple image processing tasks on an image processing apparatus 1510 with limited hardware resources (e.g., limited processor or memory resources). The image processing apparatus 1510 may be an example of the image processing apparatus described with reference to FIGS. 1-14, and may perform the methods described herein.

In one example, the capturing device 1505 may be a camera. The capture device may capture a photo and/or a video. The photo and/or the video may be taken as an input of the image processing system, and a deblurring task may be performed on the input.

In some examples, the image processing apparatus 1510 may be a computer or a smartphone. The image processing apparatus 1510 may also be other suitable apparatus that has a processor for performing image processing and a memory.

A processor may be an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor is configured to operate a memory array using a memory controller. In other cases, a memory controller is integrated into the processor. In some cases, the processor is configured to execute computer-readable instructions stored in a memory to perform various functions. In some embodiments, a processor includes special purpose components for modem processing, baseband processing, digital signal processing, or transmission processing.

The processor may execute software. Software may include code to implement aspects of the present disclosure. Software may be stored in a non-transitory computer-readable medium such as memory or other system memory. In some cases, the software may not be directly executable by the processor but may cause a computer (e.g., when compiled and executed) to perform functions described herein.

The memory may be a volatile memory or a non-volatile memory and may store data related to the multi-task processing method described above with reference to FIGS. 1 to 6. Examples of a memory device include flash memory, random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

In some cases, the image processing apparatus 1510 is implemented on a server. The server provides one or more functions to devices/users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose image processing device, a personal computer, a laptop computer, a mainframe computer, a supercomputer, or any other suitable processing apparatus.

In some cases, training data (e.g., training images for one or more image processing tasks) for training the one or more machine learning models is stored at the database 1515. A database is an organized collection of data. For example, a database stores data in a specified format known as a schema. A database may be structured as a single database, a distributed database, multiple distributed databases, or an emergency backup database. In some cases, a database controller may manage data storage and processing in a database. In some cases, a user interacts with database controller. In other cases, a database controller may operate automatically without user interaction.

Figure 16:
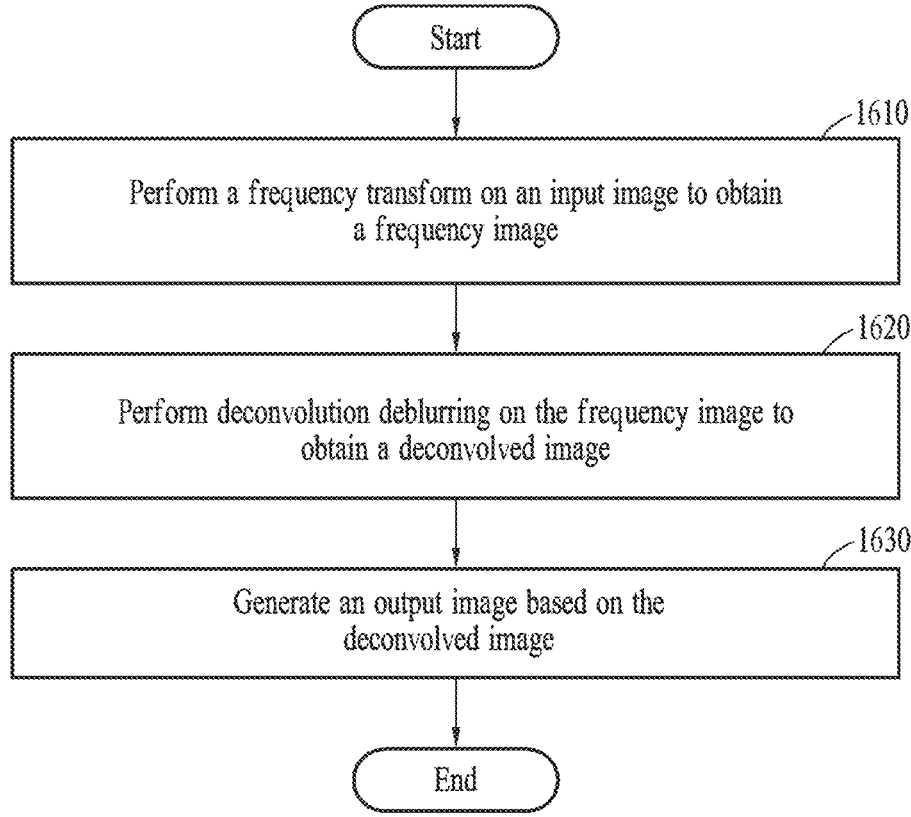
FIG. 16 illustrates a method of deblurring.

FIG. 16 shows an example of a method 1600 for deblurring according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1610, the system performs a frequency transform on an input image to obtain a frequency image. In some cases, the operations of this step refer to, or may be performed by, an image processing apparatus as described in FIG. 12. In some examples, the system transforms an input image in a first domain to a frequency image in a second domain using a logarithmic Fourier transform as described above. In other examples, a frequency transform other than a Fourier transform may be used, such as a Hartley transform. In one example, the first domain may be a spatial domain and the second domain may be a frequency domain.

According to some embodiments, the system may perform an additional frequency transform on a temporary sharp image to obtain an additional frequency image. In one example, the temporary sharp image may be a sharp version of the input image. In one example, the temporary sharp image may be a temporary sharp version of the input image generated through performing a temporary deblurring on the input image. The temporary deblurring may reduce the ill-posedness of the input image thereby partially deblur the input image. In one example, the system combines the additional frequency image and the frequency image to obtain an input for operation 1620.

At operation 1620, the system performs deconvolution deblurring on the frequency image to obtain a deconvolved image. In one example, the deconvolution deblurring comprises performing kernel-free deblurring on the frequency image generated at operation 1610. In one example, the system performs the kernel-free deblurring on the input generated by combining the frequency image and the additional frequency image at operation 1610.

At operation 1630, the system generates an output image based on the deconvolved image. In some cases, the operations of this step refer to, or may be performed by, a deblurring model as described with reference to FIGS. 1, 6-7, and 10-12. The output image may be a deblurred image generated by the deblurring network. The system may then present the output image to the user.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly, the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

As used herein, "at least one of A and B", "at least one of A, B, or C," and the like, each of which may include any one of the items listed together in the corresponding one of the phrases, or all possible combinations thereof.

The units described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, a field-programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described embodiments, or vice versa.

A number of embodiments have been described above. Nevertheless, it should be understood that various modifications may be made to these embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An image processing method, comprising:
obtaining an input image;
deblurring the input image to obtain a temporary sharp image;

generating first image data and second image data based on the input image and the temporary sharp image, respectively;
computing a blur kernel for the input image based on the first image data and the second image data using a kernel estimation model by transforming the input image, transforming the temporary sharp image, and combining the transformed input image with the transformed temporary sharp image;
performing a primary deblurring on the input image using the blur kernel to obtain a deconvolved image; and
generating an output image by performing a secondary deblurring based on the deconvolved image.

2. The image processing method of claim 1, wherein the secondary deblurring comprises image processing using a deep learning model without genera-tion of kernels by the deep learning model.

3. The image processing method of claim 1, wherein computing the blur kernel comprises:
transforming the input image into a first frequency image in a frequency domain through a logarithmic Fourier transform;
transforming the temporary sharp image into a second frequency image in the frequency domain; and
generating first input data for computing the blur kernel by combining the first frequency image and the second frequency image.

4. The image processing method of claim 3, wherein:
the blur kernel represents a blur characteristic of the input image in the frequency domain, and
the performing the primary deblurring on the input image using the blur kernel to obtain the deconvolved image comprises:
generating a third frequency image by subtracting the blur kernel from the first frequency image; and
transforming the third frequency image into the deconvolved image in a spatial domain.

5. The image processing method of claim 1, wherein:
the computing the blur kernel comprises:
transforming the input image into a first frequency image in a frequency domain through a logarithmic Fourier transform; and
computing the blur kernel based on the first frequency image using the kernel estimation model.

6. The image processing method of claim 5, wherein:
the blur kernel represents a blur characteristic of the input image in the frequency domain, and
the performing the primary deblurring on the input image using the blur kernel to obtain the deconvolved image comprises:
generating a third frequency image by subtracting the blur kernel from the first frequency image; and
transforming the third frequency image into the deconvolved image in a spatial domain.

7. The image processing method of claim 1, wherein the generating the output image comprises:
computing a compensation image based on the input image and the deconvolved image using a deblurring model; and
generating the output image by adding the compensation image to the deconvolved image.

8. The image processing method of claim 7, wherein:
the compensation image compensating for at least one of a first error and a second error, wherein the first error is based on the computing the blur kernel and the second error is based on using a non-uniform blur in the input image as a uniform blur.

9. The image processing method of claim 1, wherein:
the kernel estimation model is a neural network model.

10. A non-transitory computer-readable storage medium storing instructions that, when executed by a processor, cause the processor to:

compute a blur kernel of an input image using a kernel estimation model;

transform the input image into a first frequency image in a frequency domain;

generate a second frequency image by subtracting the blur kernel from the first frequency image;

perform a primary deblurring based on the second frequency image to obtain a deconvolved image; and generate an output image by performing a secondary deblurring based on the deconvolved image using a neural network.

11. An image processing apparatus, comprising:
a processor; and
a memory configured to store instructions executable by the processor, wherein, in response to the instructions being executed by the processor, the processor performs operations including:

obtaining an input image;

performing an initial deblurring on the input image to obtain a temporary sharp image;

generating first image data and second image data based on the input image and the temporary sharp image, respectively;

computing a blur kernel for the input image using a kernel estimation model based on the first image data and the second image data, performing a primary deblurring on the input image using the blur kernel to obtain a deconvolved image, and generating an output image by performing a secondary deblurring based on the deconvolved image.

12. The image processing apparatus of claim 11, wherein the initial deblurring is performed using a neural network.

13. The image processing apparatus of claim 11, wherein the processor further performs operations including:

transforming the input image into a first frequency image in a frequency domain through a logarithmic Fourier transform, transforming the temporary sharp image into a second frequency image in the frequency domain, and generating first input data by combining the first frequency image and the second frequency image.

14. The image processing apparatus of claim 13, wherein:
the blur kernel represents a blur characteristic of the input image in the frequency domain, and wherein the processor further performs operations including:

generating a third frequency image by subtracting the blur kernel from the first frequency image, and transforming the third frequency image into the deconvolved image in a spatial domain.

15. The image processing apparatus of claim 11, wherein the processor further performs operations including:

transforming the input image into a first frequency image in a frequency domain through a logarithmic Fourier transform, and computing the blur kernel based on the first frequency image using the kernel estimation model.

16. The image processing apparatus of claim 11, wherein the processor further performs operations including:

computing a compensation image based on the input image and the deconvolved image using a deblurring model, and generating the output image by adding the compensation image to the deconvolved image.

17. The image processing apparatus of claim 16, wherein:
the compensation image compensating for at least one of a first error and a second error, wherein the first error is based on computing the blur kernel and the second error is based on using a non-uniform blur in the input image as a uniform blur.

18. An electronic device, comprising:
a camera configured to generate an input image; and
a processor configured to:

generate a temporary sharp image by performing a temporary deblurring on the input image;

generate first input data based on the input image and the temporary sharp image;

compute a blur kernel of the input image based on the first input data using a kernel estimation model;

generate a deconvolved image by performing a primary deblurring on the input image using the blur kernel; and generate an output image by performing a secondary deblurring based on the deconvolved image.

19. The electronic device of claim 18, wherein the processor is further configured to:

transform the input image into a first frequency image in a frequency domain through a logarithmic Fourier transform;

transform the temporary sharp image into a second frequency image in the frequency domain; and generate the first input data by combining the first frequency image and the second frequency image.

\* \* \* \* \*